(12) United States Patent
Juan

(10) Patent No.: US 6,186,282 B1
(45) Date of Patent: Feb. 13, 2001

(54) BALANCED BRAKING SYSTEM

(76) Inventor: Chih-Chen Juan, No. 282, Lan Tan, Tung-Yang Hsin-Chun Chiayi City (TW)

(*) Notice: Under 35 U.S.C. 154(b), the term of this patent shall be extended for 0 days.

(21) Appl. No.: 09/265,518

(22) Filed: Mar. 10, 1999

(51) Int. Cl.[7] .................................. B62L 3/02; B62L 3/08
(52) U.S. Cl. .................. 188/24.16; 188/2 D; 188/24.21; 188/24.15
(58) Field of Search ................. 188/2 D, 24.11–24.22; 74/500.5 R–506, 502.6; 474/80

(56) References Cited

U.S. PATENT DOCUMENTS

| | | | |
|---|---|---|---|
| 3,942,609 | * 3/1976 | Hill | 188/24.16 |
| 4,057,127 | * 11/1977 | Woodring | 188/24.16 |
| 4,480,720 | * 11/1984 | Shimano | 188/24.22 |
| 4,773,509 | * 9/1988 | Sato | 188/24.16 |
| 4,850,456 | * 7/1989 | Chi et al. | 188/24.21 |
| 4,862,999 | * 9/1989 | Rakover | 188/24.19 |
| 4,914,971 | * 4/1990 | Hinkens et al. | 188/24.19 |
| 5,339,929 | * 8/1994 | Chern | 188/24.16 |
| 5,431,255 | * 7/1995 | Tsuchie | 188/24.16 |
| 5,540,304 | * 7/1996 | Hawkins et al. | 188/24.15 |
| 5,732,601 | * 3/1998 | Wu | 188/24.11 |
| 5,803,207 | * 9/1998 | Nielsen | 188/24.21 |
| 5,829,314 | * 11/1998 | Scura | 188/24.21 |

FOREIGN PATENT DOCUMENTS

| | | | |
|---|---|---|---|
| 0907527 | * 3/1946 | (FR) | 188/24.12 |
| 2733199 | * 10/1996 | (FR) | |
| 0573498 | * 11/1945 | (GB) | 188/24.17 |
| 0420656 | * 4/1948 | (IT) | 188/24.17 |
| 3-79486 | * 4/1991 | (JP) | |
| 4-362488 | * 12/1992 | (JP) | 188/24.11 |
| 7196069 | * 8/1995 | (JP) | |
| 8104280 | * 4/1996 | (JP) | |
| 8175457 | * 7/1996 | (JP) | |
| 948383 | * 2/1997 | (JP) | |

* cited by examiner

Primary Examiner—Douglas C. Butler
(74) Attorney, Agent, or Firm—Pro-Techtor International Services

(57) ABSTRACT

A balanced braking system to be used on a bicycle with a front brake and a rear brake, the balanced braking system comprising: a connecting unit, having a driving element, which is driven by the primary cables and carries a contact element; and a secondary cable, having two ends that connect the front and rear brakes and a middle part that runs over the contact element with little friction, revolving the contact element or gliding thereon. When the primary cables are pulled on, the secondary cable is moved aside by the driving element, in turn pulling on the front and rear brakes. Any different forces on the front brake and the rear brake are compensated by the secondary cable. Two guiding elements lead the secondary cable to the contact element from two sides, such that wear on the secondary cable is reduced.

1 Claim, 11 Drawing Sheets

BALANCED BRAKING SYSTEM

BACKGROUND OF THE INVENTION

1. Field of the Invention

The present invention relates to a balanced braking system, particularly to a balanced braking system, which applies a braking force uniformly on the front and rear wheels of a bicycle, such that better stability is achieved and skidding is avoided.

2. Description of Related Art

Conventional braking systems for bicycles mostly have two independent brakes for the front and rear wheels, which are driven by two independent cables and operated by a left handle and a right handle on a handlebar. This arrangement enables a user to stop the bicycle. However, during braking the two brakes are not operated at exactly the same time. Furthermore, the tension of the two cables is not equal. Therefore, unequal braking forces are applied at different times on the front and rear wheels. One of the wheels may block, while the other is still rolling. Thus the braking effect is reduced, the bicycle possibly starts to skid or even falls over.

Apart from the problem of unequal forces applied at different times, conventional brakes for bicycles use pairs of right and left pincers, which do not apply equal frictional forces. As shown in FIG. 11, a conventional brake 60 for a bicycle wheel with a rim comprises left and right pincers 61, 62, pulled towards each other by a pulling cable 63 for applying a braking force on the rim; a connecting cable 64, operated by a handle; and a hook 65 for connecting the pulling cable 63 and the connecting cable 64. The hook 65 is a bent metal plate, which guides the pulling cable 63 and takes the pulling cable 63 along, so as to pull the left and right pincers 61, 62 towards each other.

However, if the bicycle wheel has an uneven rim or a rim with an uneven surface, the bicycle wheel during rotation will not keep uniform distances to the left and right pincers 61, 62, and in the moment of braking, the left and right pincers 61, 62 will touch the rim at different times, and unequal braking forces will be applied.

Therefore, there is a need to adjust the time of contact of the left and right pincers 61, 62 and the rim automatically to ensure symmetric and even braking and avoiding a reduced braking effect and a risk of skidding.

In conventional bicycle brakes, a large frictional force occurs between the pulling cable 63 and the hook 65, so an asymmetric braking force of the left and right pincers 61, 62 on the rim is not easily compensated by gliding of the pulling cable 63 within the hook 65. Thus an insufficient braking effect and a risk of skidding result.

SUMMARY OF THE INVENTION

It is the main object of the present invention to provide a balanced braking system, which automatically applies a braking force uniformly at the same time on the front and rear wheels of a bicycle.

Another object of the present invention is to provide a balanced braking system, which ensures better stability of forces in the cables during braking.

The present invention can be more fully understood by reference to the following description and accompanying drawings.

DETAILED DESCRIPTION OF THE PREFERRED EMBODIMENTS

Figure 1:
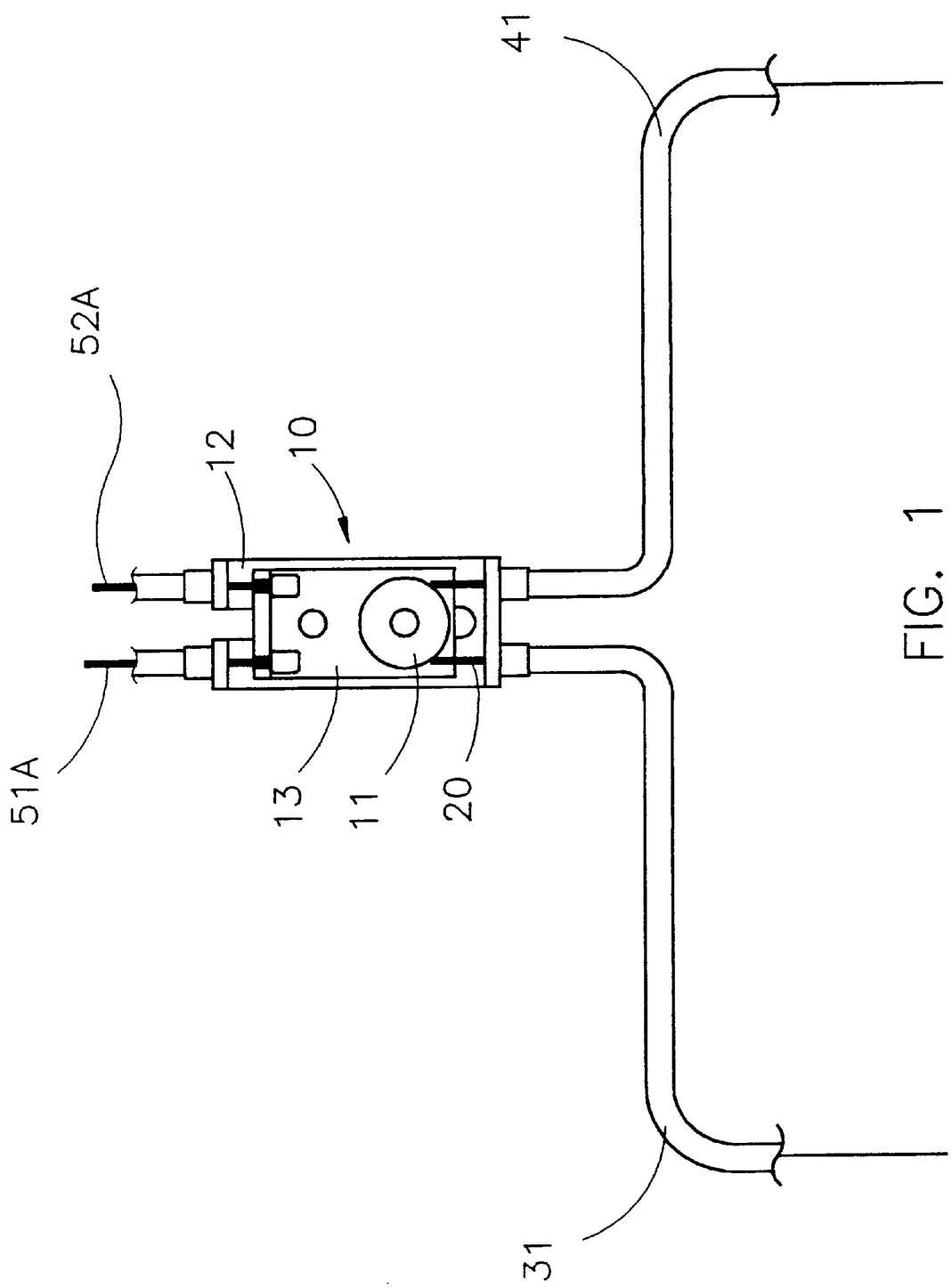
FIG. 1 is a schematic illustration of the balanced braking system of the present invention in the first embodiment.

The balanced braking system of the present invention is used on a bicycle 1 having a frame, a front wheel with a front brake 30, a rear wheel with a rear brake 40, a left handle 2 with a left primary cable 51A, and a right handle 3 with a right primary cable 52A. As shown in FIG. 1, the balanced braking system of the present invention in a first embodiment mainly comprises: a connecting unit 10, mounted on the frame of the bicycle and having an upper end and a lower end; and a secondary cable 20, having two ends which lead to the front and rear brakes of the bicycle, driving the front and rear brakes.

Figure 2:
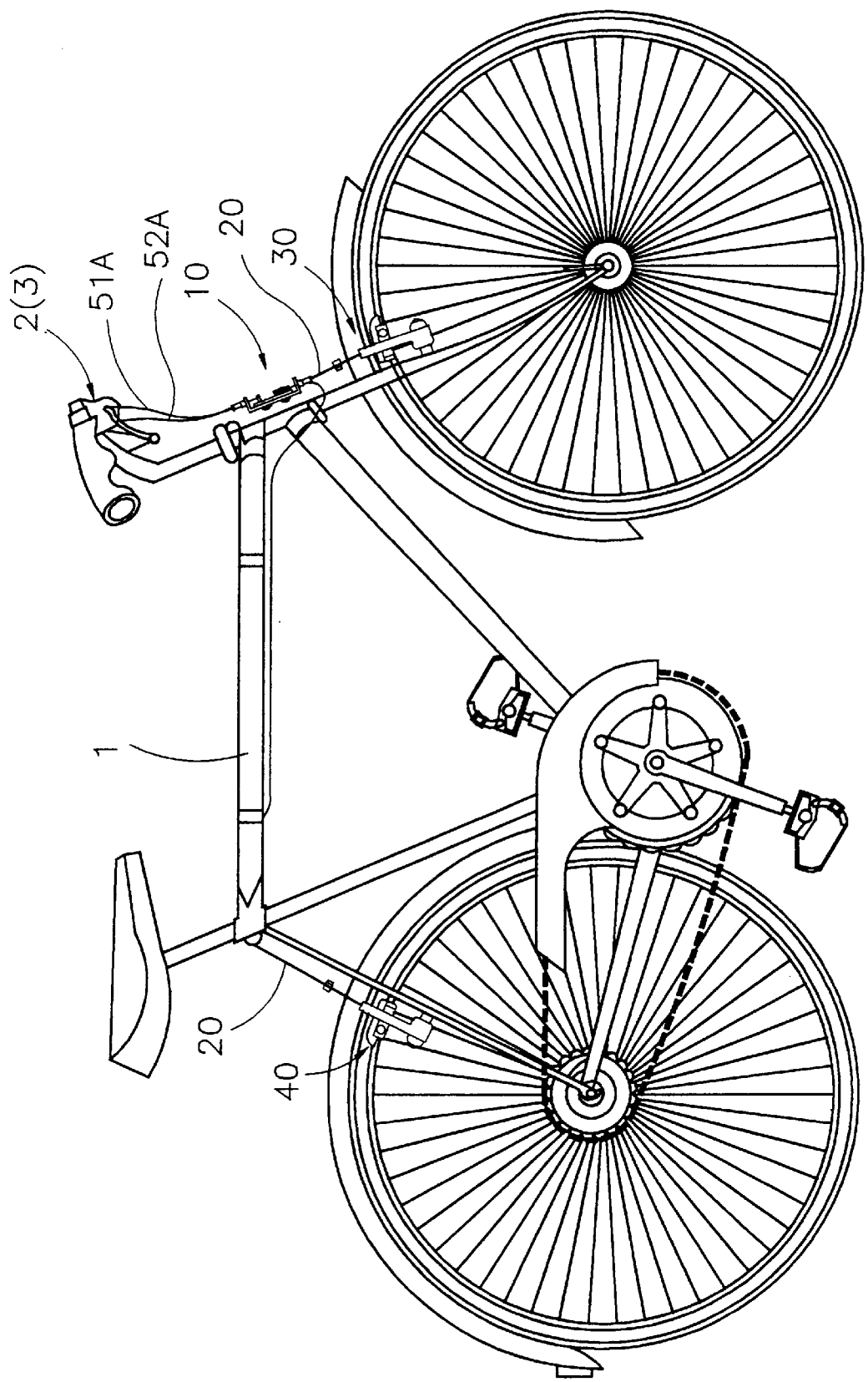
FIG. 2 is a side view of the present invention in conjunction with a bicycle.

Referring to FIG. 2, the connecting unit 10 is mounted on a suitable place on the frame. The left and right primary cables 51A, 52A are connected to the secondary cable 20, which in turn drives the front and rear brakes 30, 40.

The connecting unit 10 has a supporting element 12 and a driving element 13. The driving element 13 is a plate, glidingly mounted inside the supporting element 12 and movable in an upward and downward direction, having an upper end and a lower end. The left and right primary cables 51A, 52A are fastened to the upper end of the driving element 13, pulling the driving element 13 upward when operated. A contact element 11 is mounted on the lower end of the driving element 13, guiding the secondary cable 20 in a middle section thereof. When the driving element 13 is pulled upward, the secondary cable 20 is taken along, and the two ends thereof are pulled on, operating the front and rear brakes.

The contact element 11 revolves or allows the secondary cable 20 to glide thereon. Thus the secondary cable 20 moves with little friction, so any nonuniform distribution of braking forces on the front and rear brakes is easily compensated. If, for instance, one of the front and rear brakes starts to brake before the other, the secondary cable will shift accordingly on the contact element 11, and a symmetric application of braking forces is quickly established.

Referring again to FIG. 1, two guiding elements 31, 41 are attached to the lower end of the connecting unit 10. The two guiding elements 31, 41 are tubes, surrounding the secondary cable 20 and reaching to the front and rear brakes 30, 40, respectively. When the secondary element 20 is pulled up on the middle section thereof by moving the driving element 13 upward, the two guiding elements 31, 41 ensure that the secondary element 20 contacts the contact element 11 at constant angular positions and moves effortlessly. Thereby the front and rear brakes 30, 40 are operated symmetrically and with maximum effect. Furthermore, wear on the secondary cable 20 is kept at a minimum, such that the secondary cable 20 has an enhanced lifetime with reduced risk of breaking.

The contact element 11 is a roll, a cylinder or any element that guides the secondary cable 20 with low friction and at the same time allows to adjust the secondary cable 20. Furthermore rolls or other suitable elements are substitutable for the guiding elements 31, 41.

Figure 3:
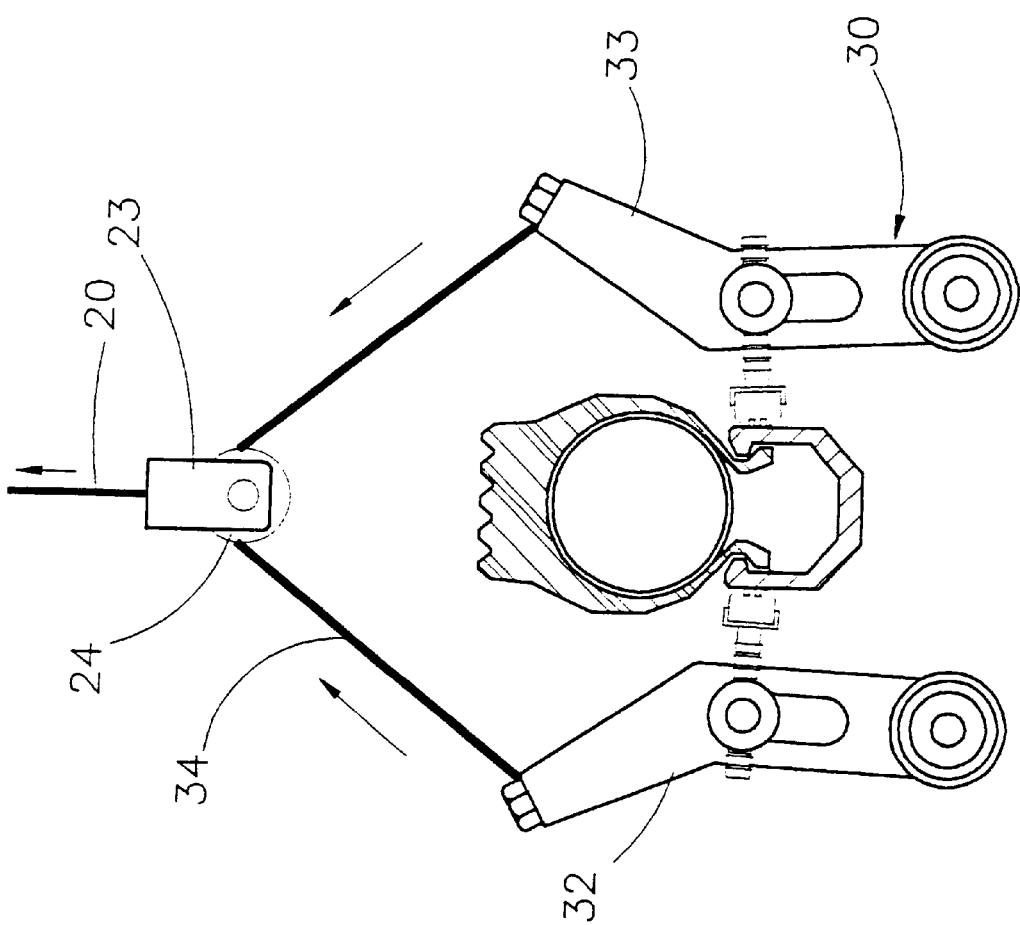
FIG. 3 is a front view of the present invention at the front brake of the bicycle.

Referring to FIG. 3, the front brake 30 has left and right pincers 32, 33, having upper ends that are connected to each other by a tertiary cable 34. A pulling unit 23 connects the secondary cable 20 with the tertiary cable 34 on a middle section thereof. A contact element 24 is fastened to the pulling unit 23 for guiding the tertiary cable 34. When the secondary cable 20 is pulled on, the pulling unit 23 together with the contact element 24 is taken along, pulling on the tertiary cable 34 on the middle section thereof. Thereby the pincers 32, 33 are brought together, braking the front wheel.

The contact element 24 is a roll or a cylinder, which revolves or allows the tertiary cable 34 to glide thereon. Thus the tertiary cable 34 moves with little friction, and any asymmetric application of braking forces of the left and right pincers 32, 33 is easily compensated. If one of the left and right pincers 32, 33 presses earlier or harder against the front wheel than the other, the tertiary cable 34 will move, and a symmetric distribution of braking forces is quickly established.

The use of the balanced braking system of the present invention is not restricted to brakes acting on rims of wheels, but also applicable to hub brakes or other brakes.

Figure 4:
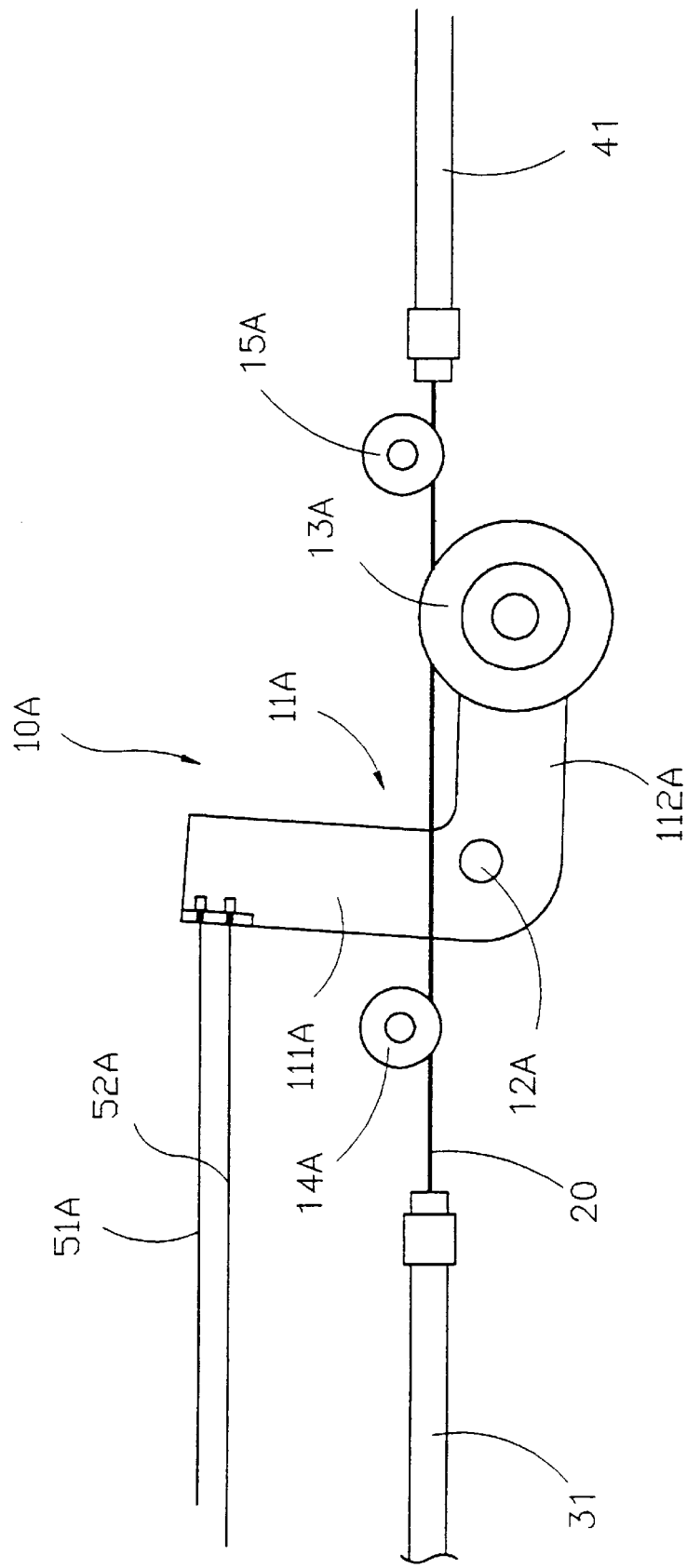
FIG. 4 is a schematic illustration of the balanced braking system of the present invention in the second embodiment.

As shown in FIG. 4, the present invention in a second embodiment comprises: a connecting unit 10A and a secondary cable 20. The connecting unit 10A further comprises: a lever arm 11A; a bolt 12A; and a contact element 13A. The lever arm 11A is shaped like the letter L, having a driven branch 111A and a driving branch 112A with a far end, which revolve around the bolt 12A. The bolt 12A is mounted on the frame of the bicycle.

The driven branch 111A is connected to the left and right handles 2, 3 by the left and right primary cables 51A, 52A. The contact element 13A is mounted on the far end of the driving arm 112A, guiding the secondary cable 20. The contact element 13A is a roll or an element that allows the secondary cable to glide with little friction. Guiding elements 14A, 15A lead the secondary cable 20 from two sides on the contact element 13A, working like the guiding elements 31, 41 of the first embodiment and reducing wear of the secondary cable 20. The guiding elements 14A, 15A are rolls or elements that allows the secondary cable to glide with little friction.

Figure 5:
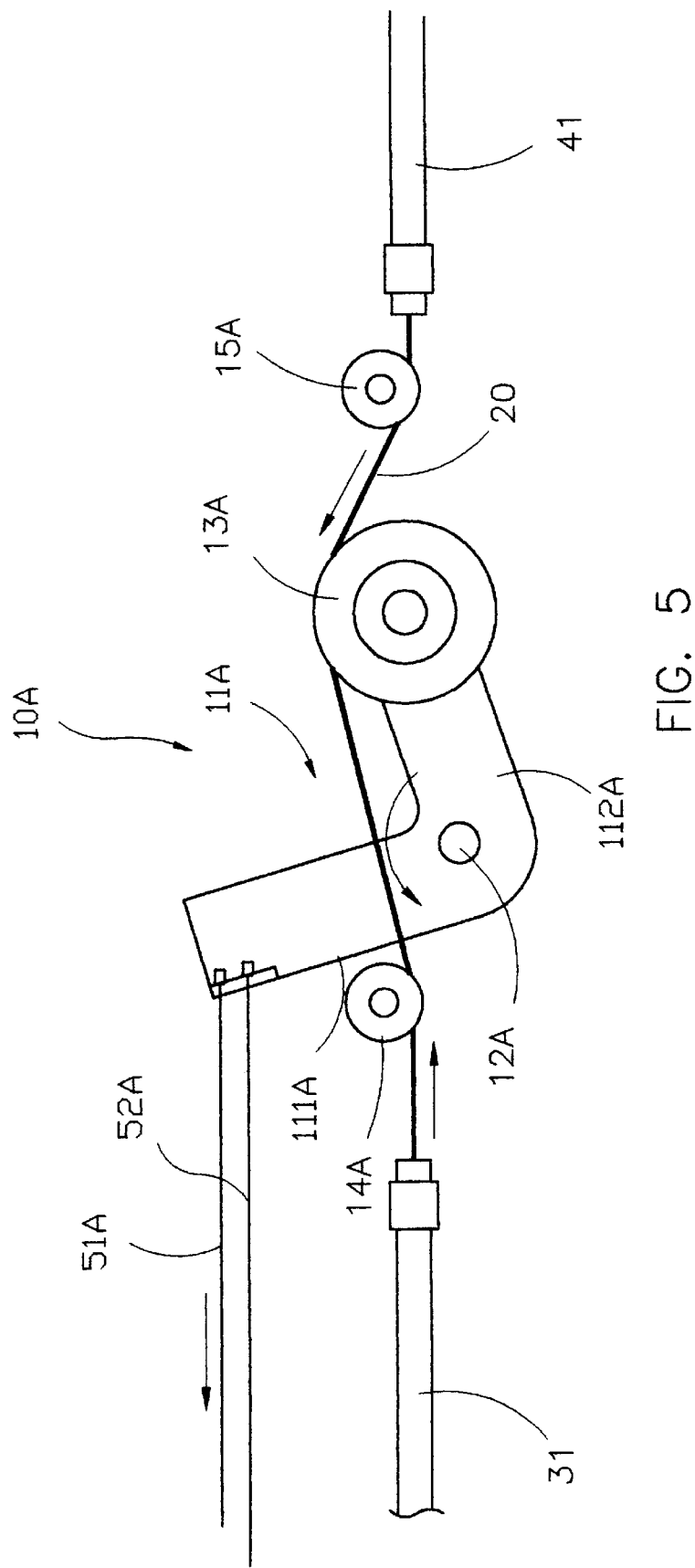
FIG. 5 is a schematic illustration of the movement of the present invention in the second embodiment.
Figure 6:
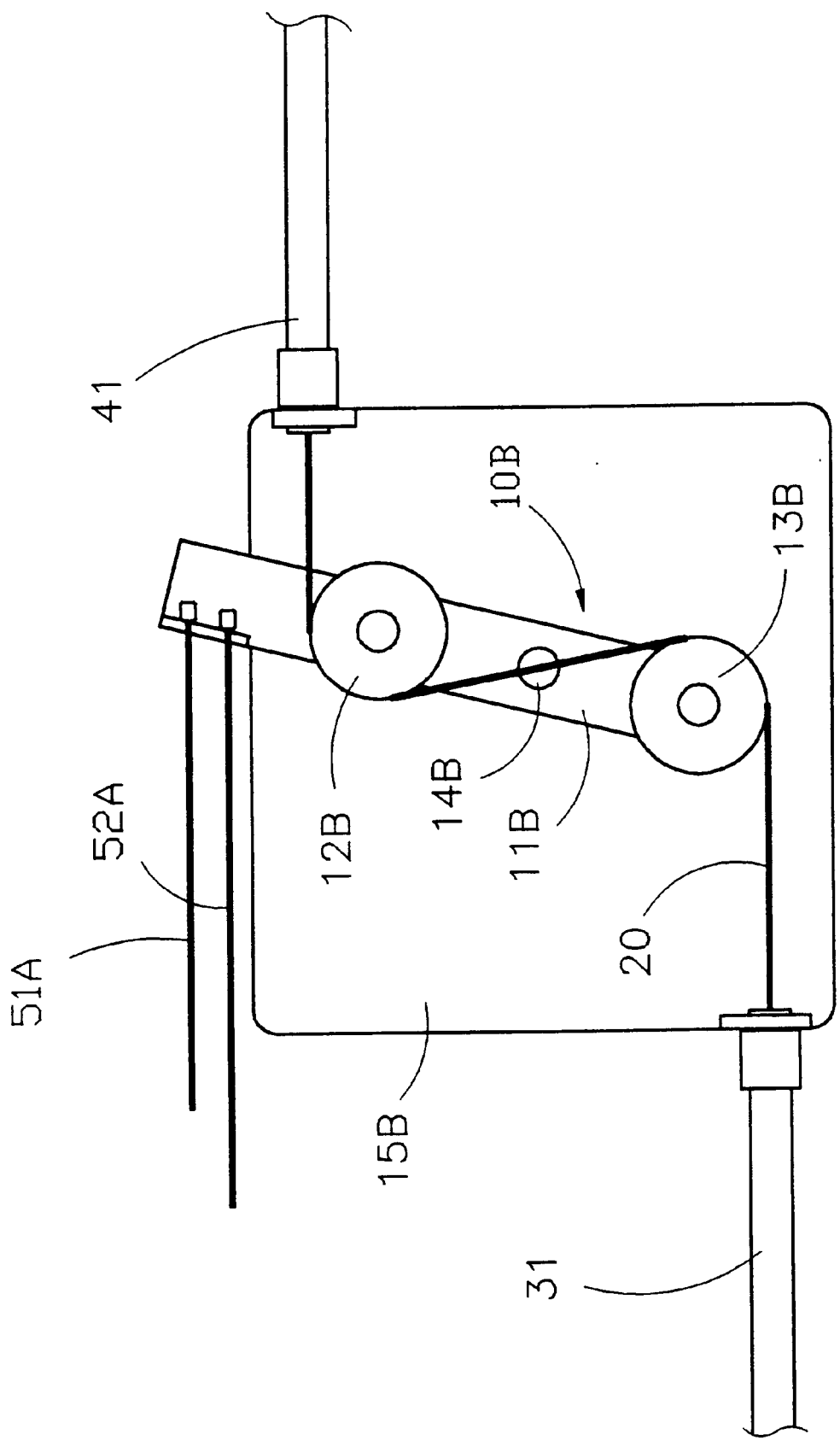
FIG. 6 is a schematic illustration of the balanced braking system of the present invention in the third embodiment.

Referring to FIG. 5, when the left and right primary cables 51A, 52A pull on the lever arm 11A, the contact element 13A moves against the secondary cable 20, shifting the secondary cable 20 aside.

The connecting element 10A, as compared to the connecting element 10, transforms a linear movement into a turning movement and has less movable parts, resulting in better reliability.

Referring to FIG. 5, the present invention in a third embodiment has a connecting unit 10B. The connecting unit 10B has a lever arm 11B, turning around a bolt 14B, which is mounted on the frame of the bicycle. Contact elements 12B, 13B are mounted on the lever arm 11B of the connecting unit 10B, with the bolt 14B located in between. The left and right primary cables 51A, 52A are connected with one end of the connecting unit 10B, causing the connecting unit 10B to turn when pulled on. A support plate 15B for holding the connecting unit 10B and the contact elements 12B, 13B is fastened on the frame of the bicycle.

The secondary cable connects the front brake 30 and the rear brake 40, passing through the guiding elements 31, 41 and, in a middle section between the guiding elements 31, 41, running along the contact elements 12B, 13B.

Figure 7:
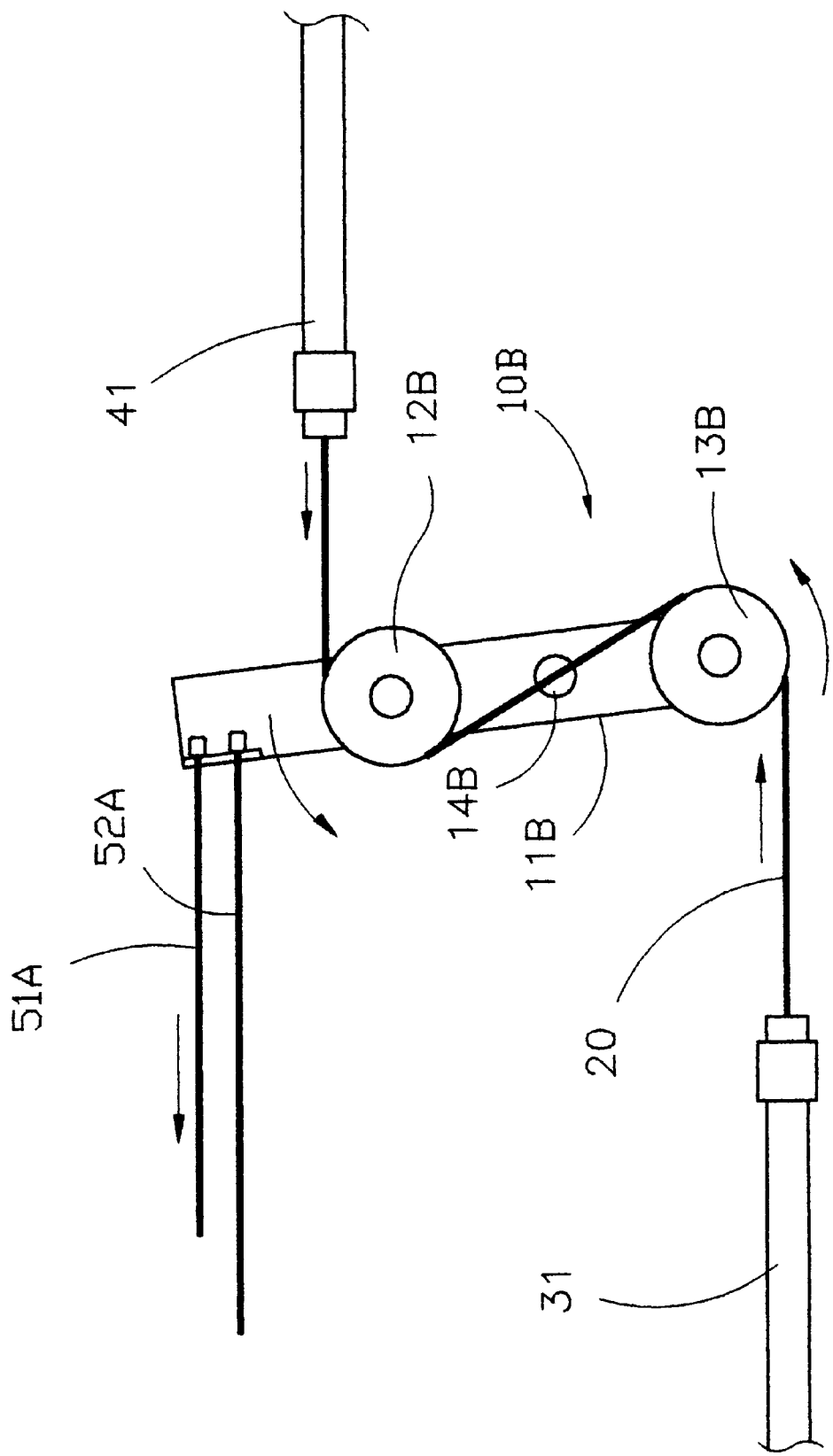
FIG. 7 is a schematic illustration of the movement of the present invention in the third embodiment.

As shown in FIG. 7, when the left and right primary cables 51A, 52A pull on the connecting unit 10B, the connecting unit 10B is turned, shifting the secondary cable 20 and pulling on the ends thereof, such that the front and rear brakes 30, 40 are operated.

The connecting element 10B, like the connecting element 10A, as compared to the connecting element 10, transforms a linear movement into a turning movement and has less movable parts, resulting in better reliability.

Figure 8:
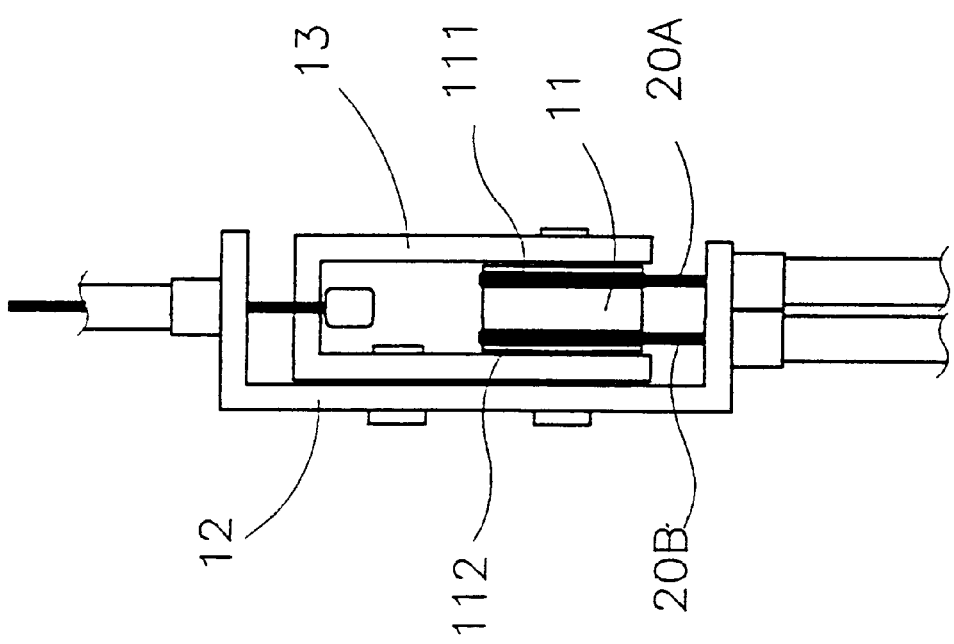
FIG. 8 is a side view of the balanced braking system of the present invention in the fourth embodiment.

In order to prevent a breakdown of both the front brake 30 and the rear brake 40 if the secondary cable 20 is damaged, the secondary cable 20 is split into two parallel cables. As shown in FIG. 8, the present invention in a fourth embodiment has the connecting unit 10 of the first embodiment and separate secondary cables 20A, 20B. Two grooves 111, 112 are cut into the contact element 11, with the secondary cables 20A, 20B fastened therein, such that the secondary cables 20A, 20B are taken along with the contact element 11.

Figure 9:
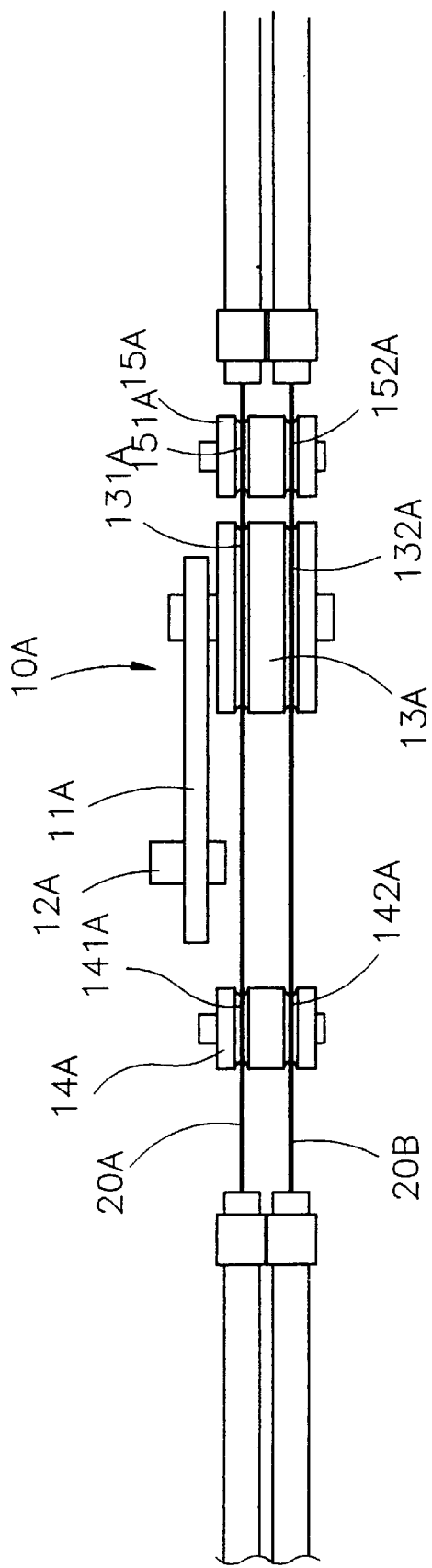
FIG. 9 is a top view of the balanced braking system of the present invention in the fifth embodiment.

Referring to FIG. 9, a fifth embodiment of the present invention modifies the second embodiment thereof, using the separate secondary cables 20A, 20B, with the contact element 13A having a pair of grooves 131A, 132A, the guiding element 14A having a pair of grooves 141A, 142A, and the guiding element 15A having a pair of grooves 151A, 152A. Thus the secondary cables 20A, 20B are guided by the contact element 13A and the guiding elements 14A, 15A.

Figure 10:
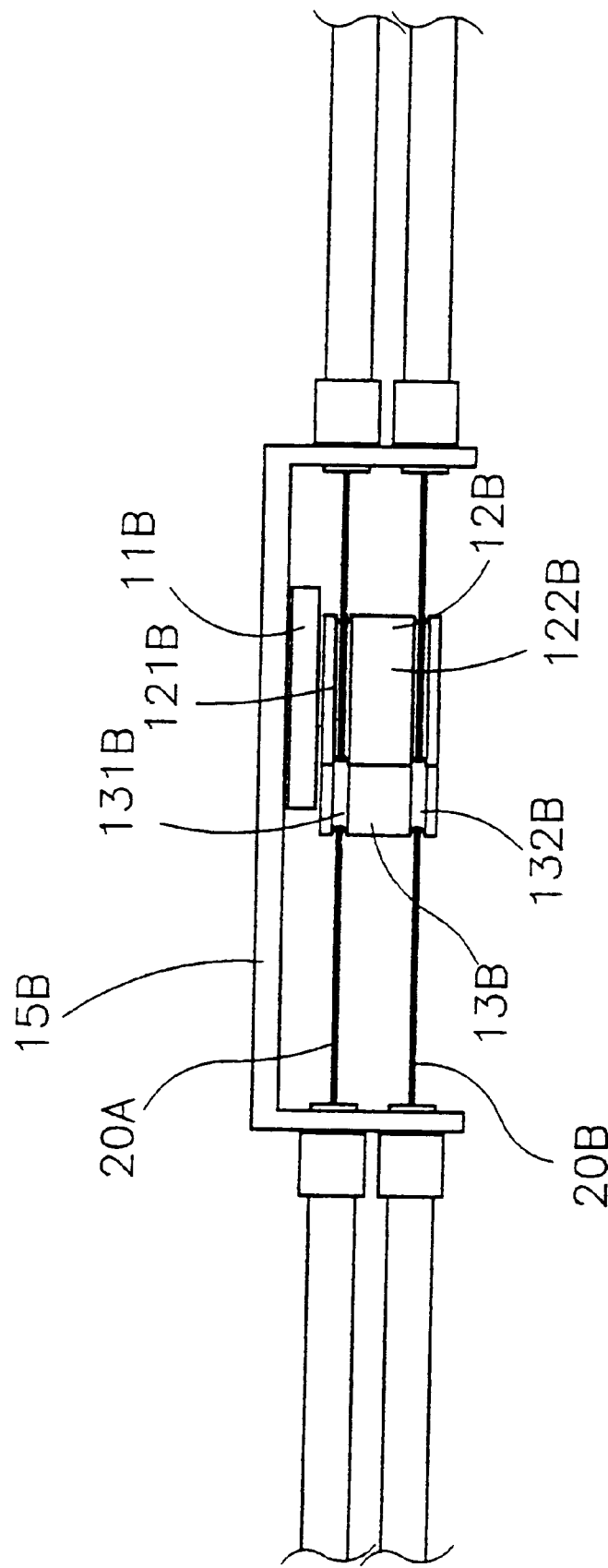
FIG. 10 is a top view of the balanced braking system of the present invention in the sixth embodiment.
Figure 11:
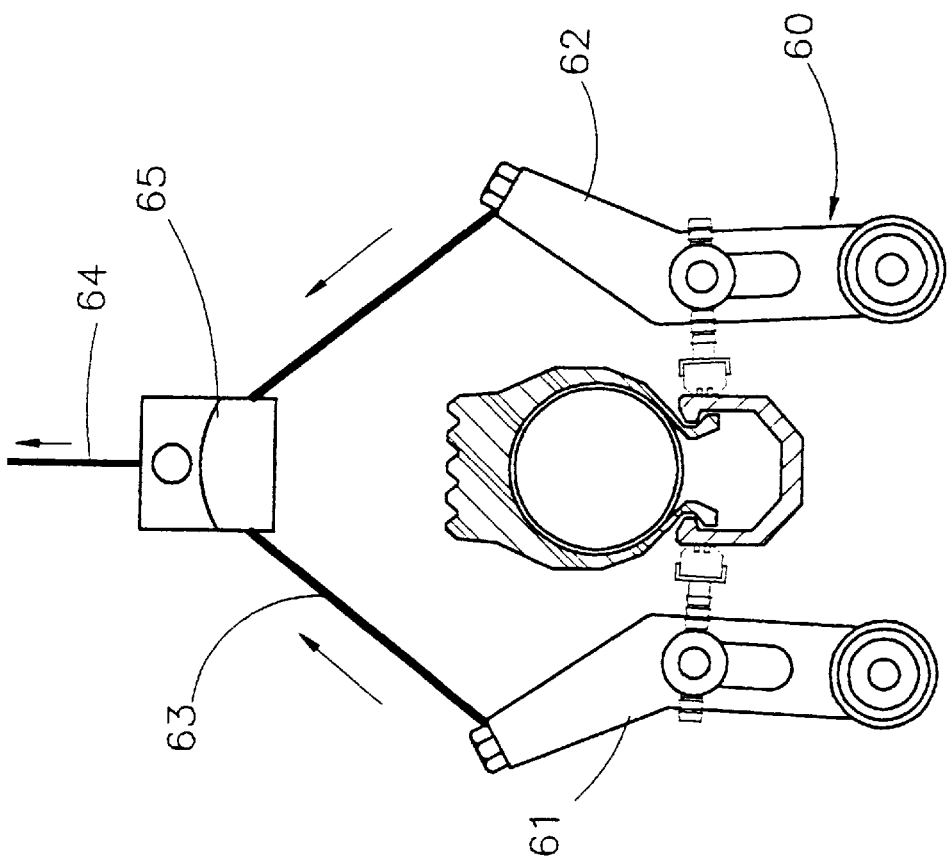
FIG. 11 (prior art) is a front view of a conventional braking system with pincers and cables.

Referring to FIG. 10, a sixth embodiment of the present invention modifies the third embodiment thereof, using the separate secondary cables 20A, 20B, with the contact element 12B having a pair of grooves 121B, 122B and the contact element 13B having a pair of grooves 131B, 132B. Thus the secondary cables 20A, 20B are guided by the contact elements 12B, 13B.

Employing the separate secondary cables 20A, 20B in the fourth, fifth and sixth embodiments of the present invention still allows the front and rear brakes 30, 40 to work, if one of the secondary cables 20A, 20B has broken. Thus a much better safety of the braking system is achieved.

The balanced braking system of the present invention works with the connecting element 10 and the secondary cable 20, which connects the front and rear brakes 30, 40, running over the contact element 11 with little friction. If there is a different frictional behavior of the front brake 30 and the rear brake 40, the secondary cable 20 automatically compensates any difference. Thus it will not happen that the bicycle has a blocking wheel and a rolling wheel. Skidding and falling over as a result of braking is therefore prevented.

While the invention has been described with reference to preferred embodiments thereof, it is to be understood that modifications or variations may be easily made without departing from the spirit of this invention which is defined by the appended claims.

What is claimed is:

1. A balanced braking system to be used on a bicycle comprising:

a connecting unit having a driving element, said driving element is driven by at least one primary cable connected to at least one operating lever, said connecting unit further includes a contact element; and a single secondary cable, ends of said secondary cable connect front and rear brakes, and a middle part of said secondary cable runs over said contact element, said secondary cable revolving said contact element or gliding thereon, said secondary cable being moved by said driving element of said connecting unit; such that when a user actuates said at least one operating lever, said secondary cable is moved by said driving element of said connecting unit, and said secondary cable applies force equally and simultaneously to said front and rear brakes; and wherein said front and rear brakes each have left and right pincers, said balanced braking system further comprising:

a pulling unit including a secondary contact element; and a tertiary cable that connects said left and right pincers, said tertiary cable includes a middle part that runs over said secondary contact element with little friction, said tertiary cable revolving said secondary contact element or gliding thereon, said tertiary cable being moved by said pulling unit driven by said secondary cable, thus pulling on said left and right pincers;

wherein force applied to said pulling unit is equally distributed to said left and right pincers by said tertiary cable.

* * * * *